United States Patent [19]
Phillips

[11] Patent Number: 6,027,133
[45] Date of Patent: Feb. 22, 2000

[54] SUPPORT STAND FOR A MOUNTAIN BIKE

[76] Inventor: Michael E. Phillips, 730 Arlington St., Tamaqua, Pa. 18252

[21] Appl. No.: 09/081,756

[22] Filed: May 20, 1998

[51] Int. Cl.[7] ...................................................... B62H 3/10
[52] U.S. Cl. ...................................... 280/293; 248/346.03
[58] Field of Search ............................... 211/22; 248/121, 248/158, 188.7, 346.01, 346.03, 177.1; 280/304, 293, 288.4, 296, 297, 298

[56] References Cited

U.S. PATENT DOCUMENTS

| | | | |
|---|---|---|---|
| 484,941 | 10/1892 | Muller | 280/293 |
| 577,592 | 2/1897 | Benton | 280/293 |
| 1,560,892 | 10/1925 | Bodine | 280/293 |
| 3,675,784 | 7/1972 | John | 211/22 |
| 3,964,611 | 6/1976 | Galen et al. | 211/5 |
| 5,025,932 | 6/1991 | Jay | 211/20 |
| 5,340,066 | 8/1994 | Ditch | 248/170 |
| 5,489,030 | 2/1996 | Kolbeck et al. | 211/22 |
| 5,497,967 | 3/1996 | Gantois | 248/166 |

*Primary Examiner*—Brian L. Johnson
*Assistant Examiner*—Avraham H. Lerner
*Attorney, Agent, or Firm*—Bell, Boyd & Lloyd

[57] ABSTRACT

A mountain bike support stand made of a centrally-positioned, elongate body and four support legs attached to the bottom end of the elongate body is described. The centrally-positioned, elongate body has a top end, a bottom end, an opening along the elongate body from the bottom end to the top end, and a central, hollow core. The top end of the elongate body has a notch for engagement with a bottom bracket axle of a mountain bike. The top end of the elongate body also contacts a bottom bracket shell of the mountain bike. The opening along the elongate body and the central, hollow core of the elongate body accommodate a crank arm of a mountain bike. The four support legs attach to the bottom end of the elongate body and each support leg has a free end.

3 Claims, 3 Drawing Sheets

SUPPORT STAND FOR A MOUNTAIN BIKE

BACKGROUND OF THE INVENTION

1. Field of the Invention

The present invention discloses a novel mountain bike support stand made of a centrally-positioned, elongate body and at least four support legs attached to the bottom end of the elongate body. The support stand provides independent, off ground support for a mountain bike and is most useful for cleaning and storage of a mountain bike.

2. Description of the Related Art

Mountain biking is a new and exciting sport. The bike is as popular in the flatlands as it is in the mountains. The mountain bike is also known as an all terrain bike and off road bike.

The most distinctive feature of a mountain bike is its frame. Geometry, size, tubing type, welding method, welding skill, design integrity, fit, flex or rigidity, weight, cable routing, warranty, manufacturer's reputation and serviceability are all key variables of the mountain bike frame. Geometry, size and tubing type are the most important of the variables.

Geometry of the frame comprises the dimensions, angles, lengths and clearances of such things as the steering tube, seat tube and vertical and horizontal tubes. In other words, geometry of the frame is what gives a bike its feel when you ride it.

Size of the frame is affected by several factors. Most obvious is the overall size of the body and the relative proportions of the rider. Furthermore, mountain bikes are designed to fit differently than road bikes. Mountain bikes should have from four to six inches of clearance between the crotch of the rider and the top tube when the rider stands flat-footed on the ground. In contrast, a road bike should have about two inches of clearance under the same circumstances.

There are five major types of tubing for the frame, namely, steel, aluminum, titanium, carbon fiber and plastic. Each type of tubing has its own advantages and disadvantages. The choice of tubing type will depend on the particular needs of the rider.

Due to the nature of mountain biking, kickstands are not a basic feature. As a result, most, if not all, mountain bikes are made and sold without a kick stand or other type of independent support. After off road use, a mountain bike should be cleaned of all mud and dirt accumulated on the bike, especially from the frame and wheels.

In the absence of a kick stand, there is no simple way to support the mountain bike during the cleaning process. The bike may be placed against a vertical support such as a wall, placed in a work stand, placed on a bicycle rack, etc. However, there are major disadvantages for each of these methods. There is little stability for a mountain bike when it is placed against a wall. Work stands and bicycle racks are expensive and not always amenable to water exposure.

There are numerous reports for improved bicycle stands and racks. For example, U.S. Pat. No. 5,492,228 (Botkin) shows a self supporting rack for athletic and sports equipment. The rack has a vertical center post with a base support at a bottom end of the pole. An upper end of the center post is unsupported. Equipment support assemblies are mounted upon the center post and are upon which athletic and sporting equipment, such as bicycles, are stored. The length of the support assemblies may be varied in order to stagger the stored items. The connection of the support assembly to the center post allows the support to be positioned anywhere along the length of the pole. The connection allows the assemblies to be extended from any exterior surface of the center post. The arms of the support assembly are also maintained in a substantially horizontal orientation by the connection when in use.

U.S. Pat. No. 5,082,120 (Vega) reveals a bicycle rack constructed of steel. The rack includes a base formed by a pair of parallel rails laterally spaced from each other and joined by a laterally extending connecting link. A pair of elongated stanchions extend upwardly from the rails to converge together at an apex which is at a height greater than the length of a bicycle. The upper extremities of the stanchions are joined together by gusset plates and either one or two hooks extend transversely outwardly from the gusset plates vertically above the base. A bicycle is suspended from one or both of the hooks by one of its wheels, so that the wheels of the bicycle are disposed one above another with the weight of the bicycle acting downwardly vertically above the base.

U. S. Pat. No. 4,979,759 (Solovay) discloses a free-standing bike stand that is separate from the bike. The stand includes a horizontal base or bottom portion, an about vertical middle portion, preferably connected to the front end of the bottom portion and an upper bike supporting portion connected to the middle portion. The upper portion includes a pair of laterally spaced rearwardly extending L-shaped arms connected at their upper ends by a cross-bar. The lower rungs of the arms support the bicycle or motorbike, for example, the tubular bottom portion of a motorbike frame.

U.S. Pat. No. 4,591,180 (Copple) shows a portable bicycle stand for supporting a bicycle. The stand is designed to permit its removal from the bicycle when not in use. The bicycle stand includes an elongated support leg having at a first end a cooperating finger and thumb adapted to detachably mount the support leg to the bicycle frame in a first support position wherein a second opposite end of the support leg engages the ground to support the bicycle in a generally upright orientation. Intermediate its first and second ends, the support leg further has a pair of aligned arms which, in cooperation with the support leg itself, are adapted to detachably mount the support leg on the bicycle frame in a second storage position.

U.S. Pat. No. 4,420,164 (Mitchell) reveals a stand for motorcycles known as dirt bikes. The stand may be positioned between the wheels of the dirt bike and made operable by the foot of the user for engaging its frame to raise and lower the front wheel of the dirt bike off its supporting surface.

U.S. Pat. No. 4,033,459 (Zach) discloses a stand for bicycles or other two wheel vehicles. The stand includes a base unit with two staggered wheel supporting cradles and a plurality of add-on units. Vertical uprights for each cradle define spaces or slots for the front wheels of two bicycles extending in opposed directions. Each base unit supports four bicycles and each add-on unit, two bicycles. When the base and add-on units are connected the uprights which define the wheel receiving slots are located along two parallel spaced axes.

However, none of these patents discloses a support stand for a mountain bike, wherein the bottom bracket axle and the bottom bracket shell of the bike directly engage the support stand.

There are also several design patents for improved bicycle stands and racks. For example, U.S. Pat. No. D358,048

(Schoenig et al.) shows an elongated stand with a three-part base and a central column on which are two sets of extensions. The frame or the wheel of a bike can be connected to the set of extensions. U.S. Pat. No. D343,148 (Cottman, Jr.) reveals a free-standing bike rack. The front frame of a bicycle is attached to the front end of the rack and the back wheel of the bicycle is connected to the back of the rack. U.S. Pat. No. D276,988 (Shedden) discloses a motorcycle stand. The stand has a tubular base, a central column and a flat plate atop the central column.

Again, none of these design patents discloses a support stand for a mountain bike, wherein the bottom bracket axle and the bottom bracket shell of the bike directly engage the support stand.

SUMMARY OF THE INVENTION

The present invention discloses a mountain bike support stand made of a centrally-positioned, elongate body and at least four support legs attached to the bottom end of the elongate body. The centrally-positioned, elongate body has a top end, a bottom end, an opening along the elongate body from the bottom end to the top end, and a centrally-positioned, hollow core. The top end of the elongate body is for engagement with a bottom bracket shell of the mountain bike. The top end of the elongate body also has a notch for engagement with a bottom bracket axle of a mountain bike. The opening along the elongate body and the centrally-located, hollow core of the elongate body accommodate a crank arm of a mountain bike. The four support legs attach to the bottom end of the elongate body and each support leg has a free end.

In a preferred embodiment, the notch of the elongate body is semi-circular in shape. In another preferred embodiment, the support legs are welded to the elongate body. In another preferred embodiment, the top end of the elongate body is provided with a formed rubber cap. In another preferred embodiment, the free end of each support leg is provided with a formed rubber cap. In yet another preferred embodiment, the elongate body is made of aluminum and the at least four support legs are made of aluminum.

In a most preferred embodiment, the notch of the elongate body is semi-circular in shape; the support legs are welded to the elongate body; the top end of the elongate body is provided with a formed rubber cap; the free end of each support leg is provided with a formed rubber cap; and the elongate body is made of aluminum and the at least four support legs are made of aluminum.

DETAILED DESCRIPTION OF THE PREFERRED EMBODIMENT

Figure 1:
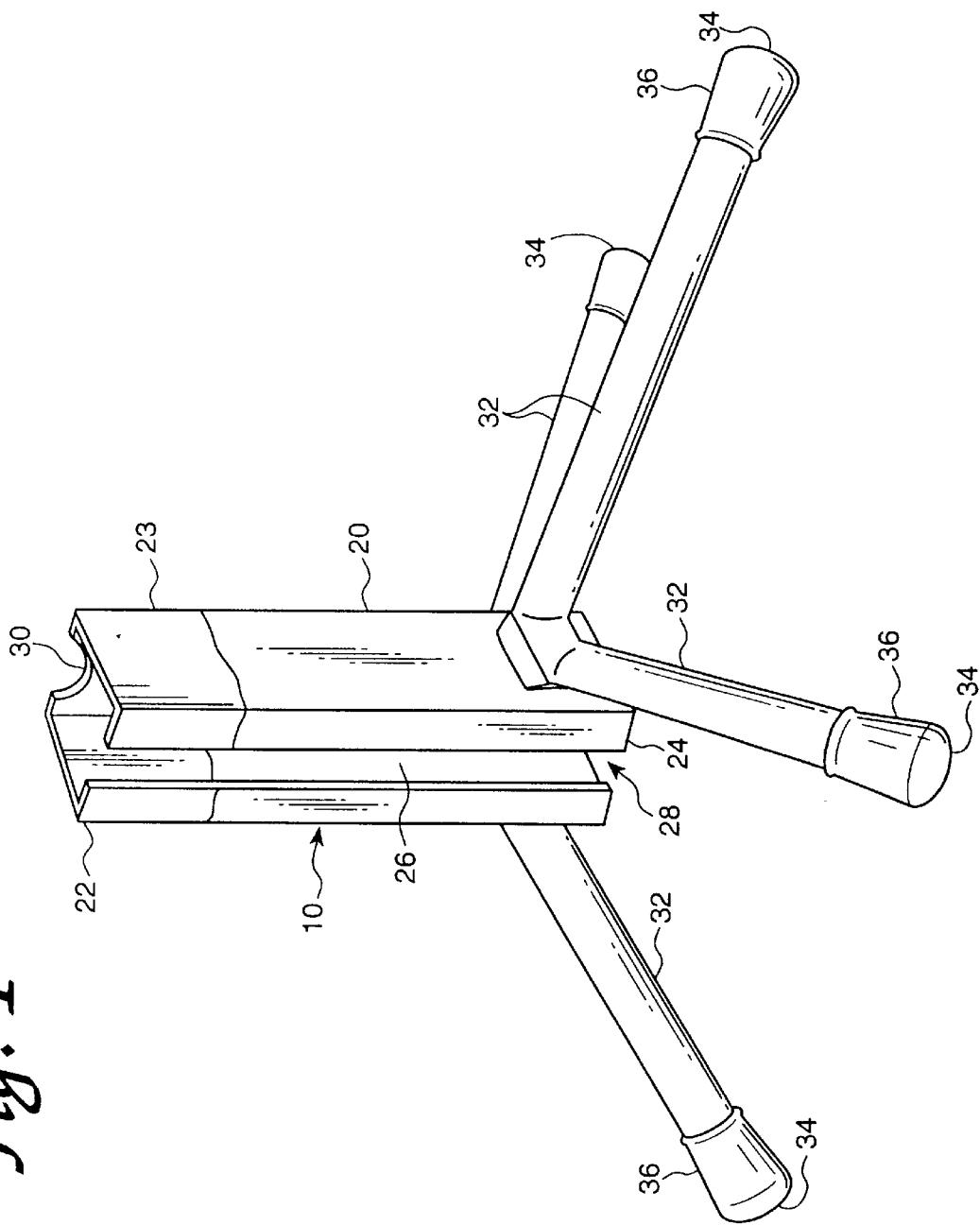
FIG. 1 shows the mountain bike support stand of the present invention.
Figure 2:
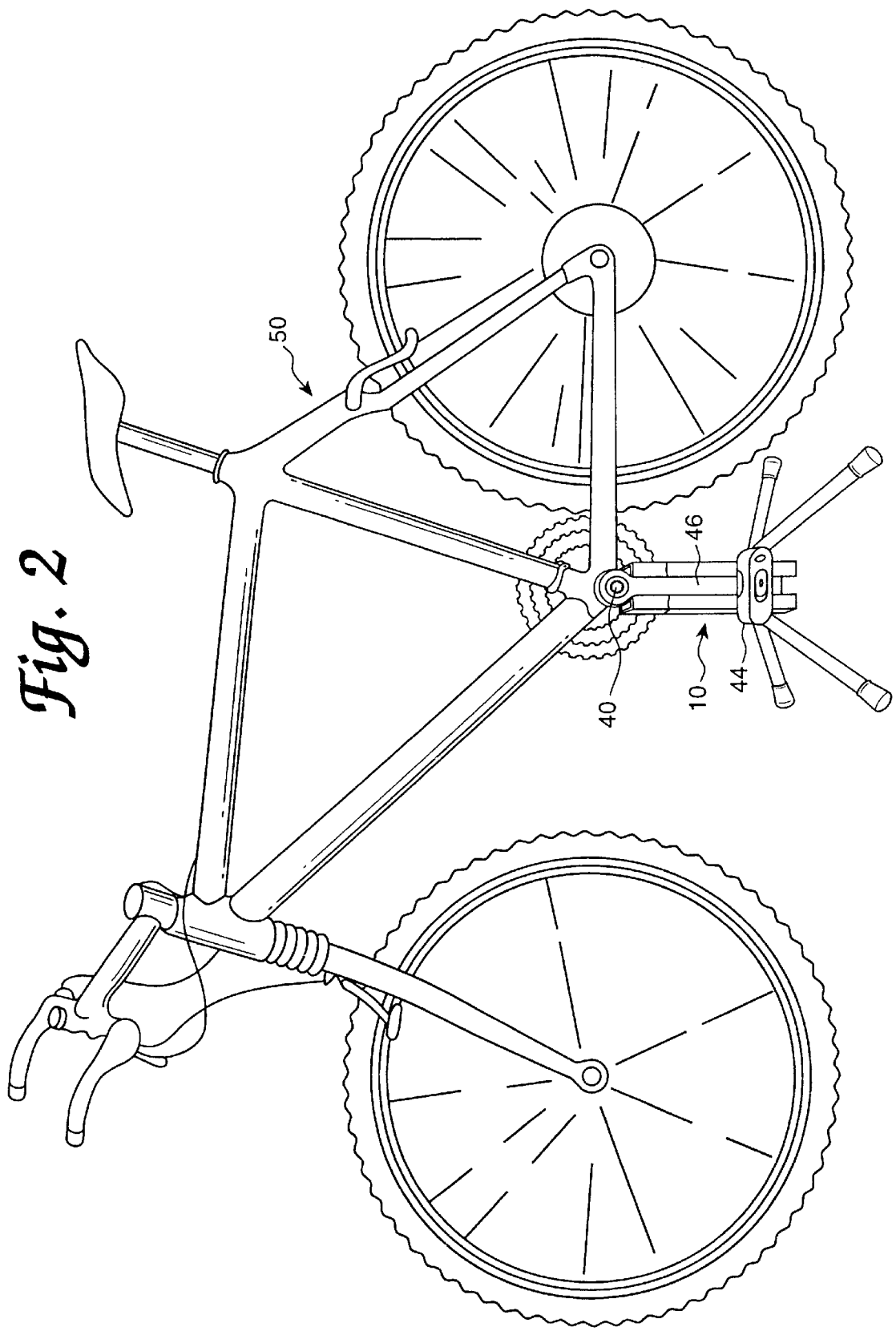
FIG. 2 shows a mountain bike resting on the support stand of the present invention.
Figure 3:
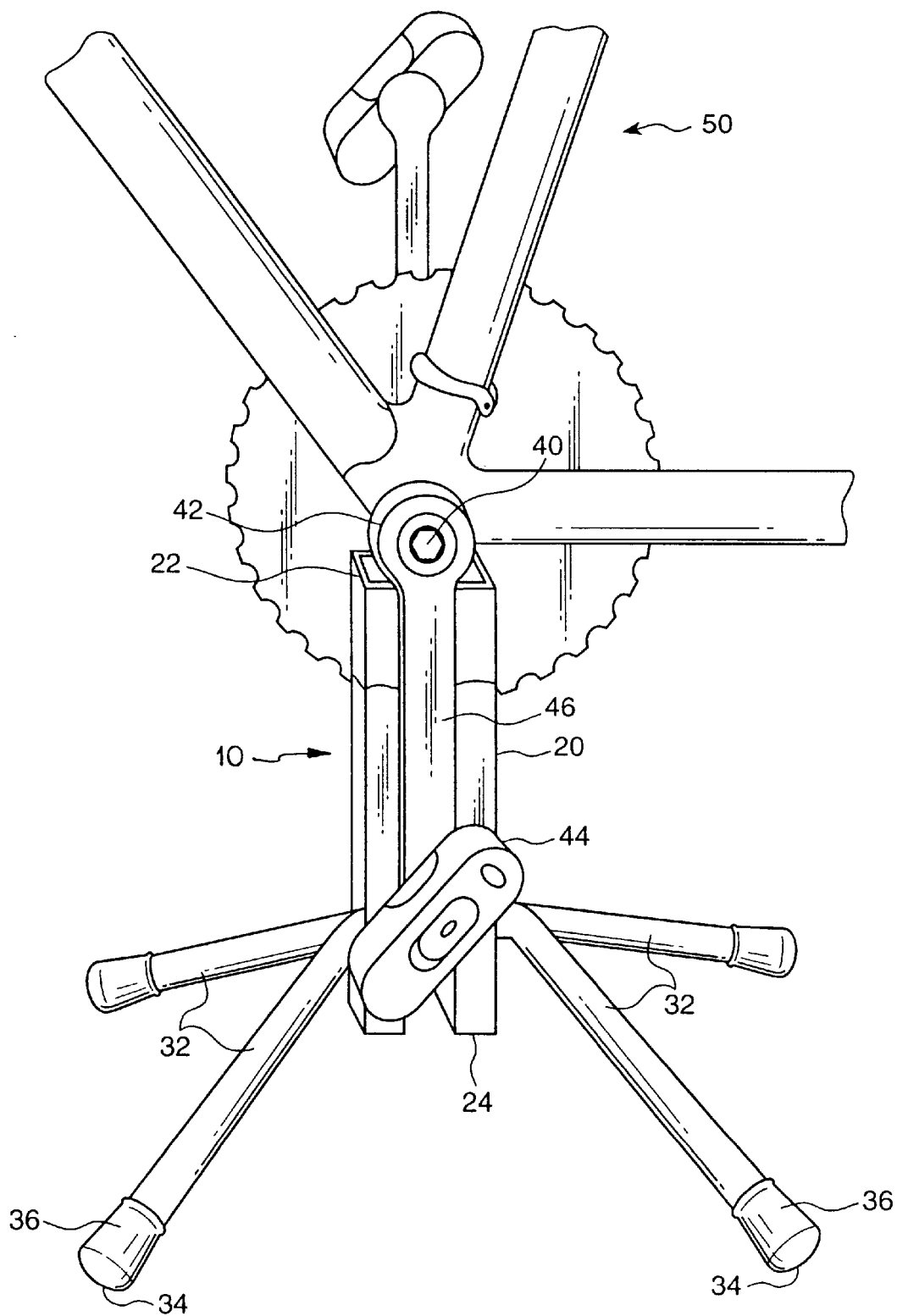
FIG. 3 shows a cut-away view of the crank arm, bottom bracket shell and pedal of a mountain bike in relation to the support stand of the present invention.

The present invention discloses a mountain bike support stand as seen in FIG. 1. The stand 10 is comprised of a centrally-positioned, elongate body 20 having a top end 22, a bottom end 24, an vertical opening 26 along the elongate body 20 from the bottom end 24 to the top end 22, and a central, hollow core 28. The elongate body 20 is centrally-positioned relative to the stand 10. The top end 22 of the elongate body 20 has a notch 30 for engagement with a bottom bracket axle located behind crank arm 40 of a mountain bike 50, as shown in FIGS. 2 and 3. FIG. 2 shows the mountain bike 50 resting on the support stand 10, while FIG. 3 shows a cut-away view of the mountain bike 50 in relation to the support stand 10.

The top end 22 of the elongate body 20 is notched so as to fit the bottom bracket axle of various sized bicycles. The top end 22 of the elongate body 20 also comes into contact with a bottom bracket shell 42 located behind the top end of crank arm 46 of the mountain bike 50 in FIG. 3.

The opening 26 along the elongate body 20 and the central, hollow core 28 of the elongate body 20 accommodate the pedal 44 and crank arm 46 of a mountain bike 50. The support stand 10 also has at least four support legs 32 attached to the bottom end 24 of the elongate body 20.

In use, the four legs 32 of the mountain bike support stand 10 are placed on a level surface. A mountain bike 50 is held over the support stand 10 and lowered so that a pedal 44 is exterior to the opening 26 of the elongate body 20, while the associated crank arm 46 of the pedal 44 is lowered into the central, hollow core 28 of the elongate body 20. The pedal 44 is lowered into the central core 28 of the elongate body 20 until the bottom bracket axle located behind crank arm bolt 40 and the bottom bracket shell 42 located behind the top of crank arm 46 of the mountain bike contact the top end 22 of the centrally-located, elongate body 20, so that the bottom bracket axle rests in the notch 30 at top end 22 of the elongate body 20. In this way, the mountain bike 50 is firmly and securely positioned off of the ground on the support stand 10.

The centrally-positioned, elongate body 20 may be made of any durable material of sufficient strength to support a mountain bike. Metals, plastics and even wood are considered suitable substrates for the elongate body. In a preferred embodiment, the elongate body is made of a 0.109 inch aluminum formed plate.

FIG. 1 shows the centrally-positioned, elongate body 20 in rectangular form. However, it should be understood that the shape of the elongate body may vary as long as the elongate body contains the necessary top end, bottom end, opening along the elongate body from the bottom end to the top end, central hollow core and notch. Thus, the elongate body may, for example, be in the shape of a triangle, a circle, a semi-circle, a cylinder, a rectangle, a square, a pentagon, etc. The rectangular form of the elongate body is preferred.

The size of the elongate body may vary in length and width depending on the size of the mountain bike to be supported. In general, the range of the size of elongate body will be from 7 to 12 inches in length (from bottom end to top end) and from 1 to 3 inches in width (from notch to vertical opening). In a preferred embodiment, the elongate body measures 9¾ inches long and 1¾ inches wide.

The notch 30 at the top end of the elongate body may be of various shapes, including triangular, rectangular and semi-circular. The semi-circular shape of the notch is preferred since the semi-circular shape conforms with the circular shape of the bottom bracket axle of the mountain bike.

The length of the opening 26 along the elongate body parallels the length of the elongate body discussed above. Thus, the length of the opening will vary depending on the size of the mountain bike to be supported. In general, the range of the length of the opening will be from 7 to 12 inches. In a preferred embodiment, the length of the opening along the elongate body measures 9¾ inches. The width of the opening along the elongate body ranges from one-half to one and one-half inches. In a preferred embodiment, the width of the opening measures one inch.

At least four support legs 32 are attached to the bottom end of the elongate body. The support legs may be made of any durable material of sufficient strength to support a mountain bike. Again, metals, plastics and even wood are considered suitable substrates for the support legs. In a preferred embodiment, the support legs are made of the same material as that of preferred embodiment of the elongate body, that is, aluminum.

The support legs elevate the bottom end of the elongate body one to four inches from the level surface or ground. In a preferred embodiment, the support legs elevate the bottom end of the elongate body two and one half inches off of the ground. The length of each support leg may vary from five to 20 inches. In a preferred embodiment, the support legs are made of two aluminum round bars (¾ inch in diameter) measuring 17½ inches in length, with a bend to give a distance out from the bending point of 11 inches and 7 inches, respectively. Thus, two of the support legs measure 11 inches in length, while the other two support legs measure 7 inches in length. In a preferred embodiment, the overall height of the support stand from the point of contact of the support legs with the level surface, i.e., the free ends 34 of the legs to the top of the elongate body is 12 inches.

The support legs are fastened to the elongate body at a height of approximately one inch from the bottom of the unnotched or bottom end of the elongate body. The support legs may be fastened to the elongate body by any means sufficient to form an attachment of the required strength to support a mountain bike. Thus, the support legs may, for example, be welded to, screwed to or interlocked with the elongate body. In a preferred embodiment, the support legs are welded to the elongate body.

In a preferred embodiment, the support stand is provided with custom powder coated finish. As a result of the powder coating finish, the support stand is provided with an outer surface that has superior durability from rust and damaging solvents. The finished support stand looks new for years with only a water wash off. The powder coating finish will not chip off under normal or even most abnormal use.

In a preferred embodiment, the top end 22 of the elongate body contains a custom formed rubber cap or rubber coating 23 to ensure a snug fit for various size bicycles. The custom formed rubber cap or rubber coating also reduces or eliminates metal scratching of the bottom bracket axle and crank arm of the mountain bike. The custom formed rubber cap or rubber coating may extend over the entire length of the elongate body. In practice, a rubber cap extending from the top of the elongate body downward for two inches is preferred.

In a preferred embodiment, each of the free ends 34 of the support legs 32 are provided with a custom formed rubber cap or rubber coating 36. The free ends 34 of the support legs contact the level surface or ground and the rubber cap or rubber coating 36 provide improved contact with the level surface, prevent scratching of the level surface and eliminate metal scratching and wear of the ends of the support legs. In a preferred embodiment, the rubber caps measure ¾ of an inch in length and are made of neoprene.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims. In this regard, the present support stand invention is applicable to all types of bicycles, motor bikes and motorcycles, as well as mountain bikes.

Thus, it is to be understood that variations in the present invention can be made without departing from the novel aspects of this invention as defined in the claims. All patents and articles cited herein are hereby incorporated by reference in their entirety and relied upon.

What is claimed is:

1. A mountain bike support stand, comprising:

a) an elongate body having a top end, a bottom end, an opening along the elongate body from the bottom end to the top end, and a central, hollow core,
   wherein the top end of the elongate body is for engagement with a bottom bracket shell of a mountain bike,
   wherein the top end of the elongate body has a notch for engagement with a bottom bracket axle of a mountain bike and wherein said notch is semi-circular in shape,
   wherein the top end of the elongate body is provided with a formed rubber cap, and
   wherein the opening along the elongate body and the central, hollow core of the elongate body are adapted to accommodate a crank arm of a mountain bike; and b) at least four support legs attached to the bottom end of the elongate body,
   wherein two of the support legs are longer in length than the other support legs,
   wherein the support legs are welded to the elongate body,
   wherein each support leg has a free end, and
   wherein the free end of each support leg is provided with a formed rubber cap.

2. The mountain bike support stand of claim 1, wherein the elongate body is made of aluminum and the at least four support legs are made of aluminum.

3. The mountain bike support stand of claim 1, wherein the elongate body and the support legs are covered with a powder-coated finish.

* * * * *